A. W. ELLING.
AIR AND GAS MIXER.
APPLICATION FILED MAR. 8, 1919.

1,348,272.

Patented Aug. 3, 1920.

INVENTOR.
Albert W. Elling.
BY
ATTORNEY.

UNITED STATES PATENT OFFICE.

ALBERT W. ELLING, OF LATIMER, IOWA.

AIR AND GAS MIXER.

1,348,272.  Specification of Letters Patent.  Patented Aug. 3, 1920.

Application filed March 8, 1919. Serial No. 281,408.

*To all whom it may concern:*

Be it known that I, ALBERT W. ELLING, a citizen of the United States, residing at Latimer, in the county of Franklin, State of Iowa, have invented certain new and useful Improvements in Air and Gas Mixers for Explosive Engines; and I do hereby declare the following to be a full, clear, and exact description of the invention, such as will enable others skilled in the art to which it appertains to make and use the same.

This invention relates to new and useful improvements in attachments for gasolene engines.

One object of the present invention is to provide a novel and improved device for speeding the vaporization of the kerosene or gasolene used as fuel for the engine.

Another object is to provide a novel and improved device of this character wherein the gasolene or other liquid fuel is more quickly vaporized in its passage from the carbureter to the intake manifold of the engine and whereby the gas is properly mixed with the air during such passage.

Other objects and advantages will be apparent from the following description when taken in connection with the accompanying drawing.

Figure 1:
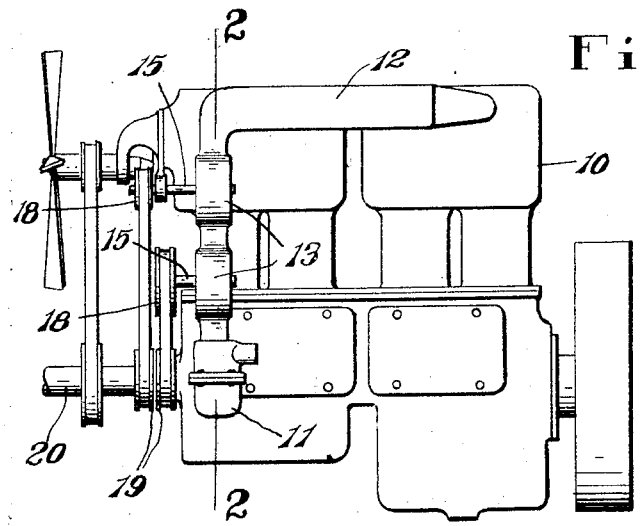
Figure 1 is an elevation of an automobile engine showing my invention applied thereto.
Figure 2:
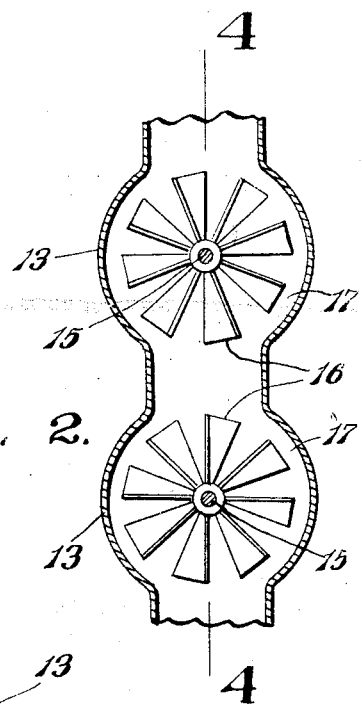
Fig. 2 is an enlarged vertical sectional view taken on the line 2—2 of Fig. 1, but only through the portion of the intake manifold which contains the invention.
Figure 4:
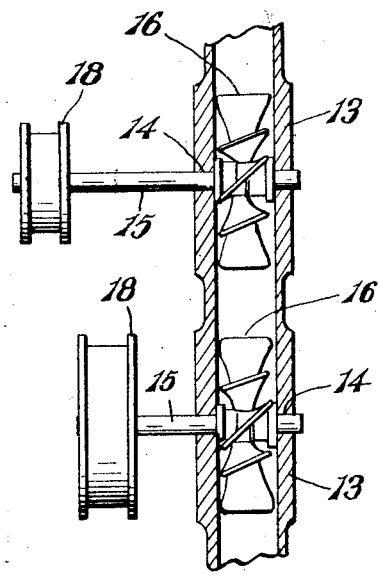
Fig. 4 is an enlarged vertical sectional view taken on the line 4—4 of Fig. 3.
Figure 3:
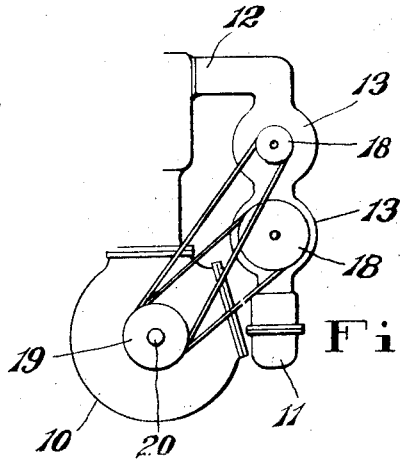
Fig. 3 is an elevation viewed from the right in Fig. 1, only a portion of the engine being shown.

Referring particularly to the accompanying drawing, 10 represents an automobile engine, 11 the carbureter, and 12 the intake manifold thereof. The vertical portion of the manifold is rectangular in cross section as clearly shown in the drawing and has two or more enlarged circular portions 13, the flat walls of which are provided with the shaft openings 14 for the support of the ends of the shafts 15. Mounted on each of these shafts, and rotatable within the enlargement 13, is a fan 16. It will be noted that the shafts are disposed horizontally so that the fans rotate in vertical planes. From an inspection of Fig. 2 it will be seen that the fans are of such size that they do not completely fill the enlargements or fan housings 13, thereby leaving passages 17 through which the fans force the gas on its way to the engine cylinders. The suction at the upper end of the vertical leg of the manifold, due to the action of the pistons within the cylinders, causes the flow of gas to the engine cylinders. The outer end of each of the shafts 15 is provided with a belt wheel 18 which is driven from a similar wheel 19 on the engine shaft 20. It will be noted, however, that the wheels 18 are of slightly different diameters, whereby one of the fans will be driven at a greater speed than the other. Preferably the upper wheel 18 is smaller than the lower one so that the upper fan will more effectively coöperate with the pistons in creating the proper suction to draw the gas into the cylinders. Some of the gas will seek to flow directly through the fans, but by reason of the rapid rotation of said fans, this gas will be thrown by centrifugal force outwardly into the arcuate passages, on to the next fan, and finally into the cylinders of the engine.

In the mixing of any number of ingredients the operation is performed slowly at first and then the speed later increased. In the first slow operation the different ingredients are completely broken up and intermingled to a large extent, but when the operation is increased in speed, this mixing or intermingling of the broken up ingredients will be accomplished with greater ease and with the proper result that the ingredients are distributed in the desired ratio through the mixture. In the present device the lower fan, traveling at a slow speed serves to thoroughly break up the gas and air particles so that when they reach the upper and faster moving fan they will be thoroughly and intimately mixed before being finally delivered to the engine cylinders. From this the function of the fans running in opposite directions and at different speeds will be apparent.

While I have shown the carbureter and vaporizer as arranged at the front end of the engine, I wish it understood that the same may be disposed at any point thereon, and the means for driving the vaporizer arranged consistent with the engine and other parts.

What is claimed is:

1. A device of the character described comprising a conduit having enlargements providing fan housings positioned in superposed relation, rotatable shafts extending transversely through the fan housings, fans mounted upon the shafts within the fan housings, and pulley wheels mounted upon the outer end portions of the shafts, the pulley wheels being of different diameters for causing rotation of the shafts at different speeds.

2. A device of the character described comprising a conduit having fan housings positioned in spaced relation, shafts extending through the fan housings, fans mounted upon the shafts within the fan housings, for imparting rotary movement to the fan shafts with one fan shaft rotating at a different rate of speed from the other fan shaft.

In testimony whereof, I affix my signature in the presence of two witnesses.

ALBERT W. ELLING.

Witnesses:
D. H. DOHRMANN,
FRED ELLING.